UNITED STATES PATENT OFFICE.

JOSEPH HAY AMIES, OF PHILADELPHIA, PENNSYLVANIA.

PAVING-BLOCK.

SPECIFICATION forming part of Letters Patent No. 617,705, dated January 17, 1899.

Application filed December 1, 1896. Serial No. 614,123. (No specimens.)

*To all whom it may concern:*

Be it known that I, JOSEPH HAY AMIES, a citizen of the United States, residing at Philadelphia, county of Philadelphia, and State of Pennsylvania, have invented certain new and useful Improvements in Paving-Blocks; and I hereby declare that the following specification is a full, clear, and exact description of the said invention.

The object of my invention is the production of a composite paving-block consisting of a base composed principally of clay and fibers, formed by treatment in water, and a top composed of several distinct layers, principally of asphalt and fibers, formed by treatment in oils, both base and top being cemented together under pressure, as hereinafter particularly described.

The method of constructing said paving-blocks consists, essentially, of the following steps, namely: First I place in a tank properly equipped with mechanism for mixing and stirring its contents a quantity of water and a quantity of clay, in about the proportions of one and one-half measures of water to one measure of clay. When the clay is thoroughly dissolved, I agitate the contents of the tank and bring all the clay in suspension in said water. I then add to the same fibrous materials of all descriptions—such as grasses, hay, straw, leaves, twigs, shavings, hair, and the like—and mix them perfectly together until they become one pulpy mass. When I can work no more fibers into the said mass, I then add a mixture of dry hydraulic cement and pulverized rock (in about the proportion of one part of cement to two parts of the rock) to the mass and incorporate it as far as possible. I then remove the mass from the tank and coat it thickly with the said mixture of cement and pulverized rock. Having done this, the said mass is then placed in molds as the first step toward making the said paving-blocks. The second step consists in placing upon the said mass while in said molds a layer of the said mixture of cement and pulverized rock in a perfectly dry condition. My reason for using the said mixture of dry hydraulic cement and pulverized rock in the manner above described is a very important one, for while the said clay and fibers will not set with the cement, yet the said dry cement and pulverized rock will act as an absorbent of the moisture in the mass, which will seek to escape when pressure is brought down upon the contents of the said molds at the final stage of the process. Besides, the cement gives the clay a harder, firmer, and tougher condition when dry, the fibers acting as a binder to the whole; but I can secure the same result by placing a hot-pitched rubble upon the face of the said first layer. My third step consists in placing in said molds upon the two layers already therein another layer which is composed of the said fibrous materials or the like saturated with a composition of oils, pitch, and tars. The composition I prefer to use for this purpose consists of ship-pitch and resin-oil or petroleum-tar, in the proportions of about ten parts of pitch to two of the tar or resin-oil. This composition I boil down, and in the hot liquor I steep the said fibers. They are then placed in the said molds in this hot state. Fourth, upon the said layers already in the said mold I now place another layer which is composed of the following materials, namely: refined asphalt or refined asphalt-gum of the best quality and test, shredded fibers of paper, wood, refuse leather, rope, hair, cotton, asbestos, and such fibrous materials. The asphalt and the fibers are thoroughly boiled and mixed together in a proper vessel, and to the same when in said vessel there is added a quantity of pulverized rock, gravel, sand, and the like, for the purpose of effecting a perfect absorption of the oil of the asphalt and imparting hardness and strength to resist indentation to the mass. Fifth, when said fourth layer is in said molds I then face it with a quantity of steel, iron, and metal filings of all kinds, which are thrown in said molds loosely on the top, in a hot state, of the said fourth layer, or the metal borings or filings may be mixed with the said fifth layer; or in lieu of the said metal filings I may face the said fourth layer with ground lime-rock, sand, or other mineral matter ground fine.

In the above, layers 1 and 2 constitute the base, which when compressed will preferably be about four inches or four and one-quarter inches in thickness, while layers 3, 4, and 5 constitute the top, which when compressed will preferably be about one inch in thickness. In lieu of layers 3, 4, and 5, constituting the top, as aforesaid, I may use the following materials, namely: fibers of the character named in the foregoing, or in their stead or in combination with them shredded paper, which I place in a vat partly filled with oils, tars, and resins, and I boil them until they are thoroughly saturated with the said viscid matters. I then remove them from the vat and thoroughly dust them with ground lime-rock, opening and separating them as far as possible for that purpose, that each individual fiber may be coated with said lime-rock dust. I then take these fibers and mix with them Portland cement and pulverized rock and dampen the whole with water. In this condition they are placed in said molds upon layers 1 and 2, constituting the base, as aforesaid. I now bring down upon the contents of the said molds plungers having a pressure up to ten thousand pounds to the square inch, if necessary, and the result is the formation of concrete blocks having the qualities of being, when laid down as a pavement, noiseless, durable, and fire and moisture proof, with a metal or mineral surface, according to the choice of materials made, as stated above. It is evident that I may lay this pavement in sheets.

I wish particularly to point out a very valuable quality and feature in the construction of the said paving-block, one which I believe is entirely new. It is the method by which oil and water are blended together into a joint which is exceedingly strong and effective. I refer to the cement and pulverized-rock layer No. 2. Layer No. 1, constituting the base, as explained in the foregoing, consists of water, clay, and fibers compounded together in a cold state or condition, while the top, consisting of the layers above layer No. 2, is composed of fibers, asphalt, oils, and gums compounded together in a very hot condition. When the plungers are brought down upon the contents of the said molds, the surplus water of layer No. 1 finds room for itself in the cement of layer No. 2, which absorbs it, and in so doing brings out the adhesive and binding qualities of the said cement. In like manner the surplus oils and gums of the layers superposed upon layer No. 2 also enter said layer and become incorporated and set therewith, with the result of making a perfect joint between all the said layers and holding the whole block firmly together.

Having now described my invention, what I claim as new, and desire to secure by Letters Patent, is—

1. In a paving-block the combination of two strata, the lower one of same being composed of clay and fiber, and the top stratum being composed of asphalt and fibers, faced on its upper surface with a composition of metal fibers, ground stone and cement, substantially as described.

2. In a paving-block or pavement the combination of two strata, the lower one of same being composed of clay and fibers, and the top one being composed of fibers and shredded paper vulcanized by being thoroughly saturated with a composition of oils and resins and being thereafter filled with cement and pulverized rock, and faced on its upper surface with a composition of metal fibers, ground stone and cement, substantially as described.

JOSEPH HAY AMIES.

Witnesses:
CLEMENT CRESSON,
JAS. U. ROBERTSON.